Aug. 25, 1925.
A. BRÜNINGHAUS
1,551,465
METHOD OF DIRECTLY PRODUCING STEEL
Filed Jan. 12, 1925
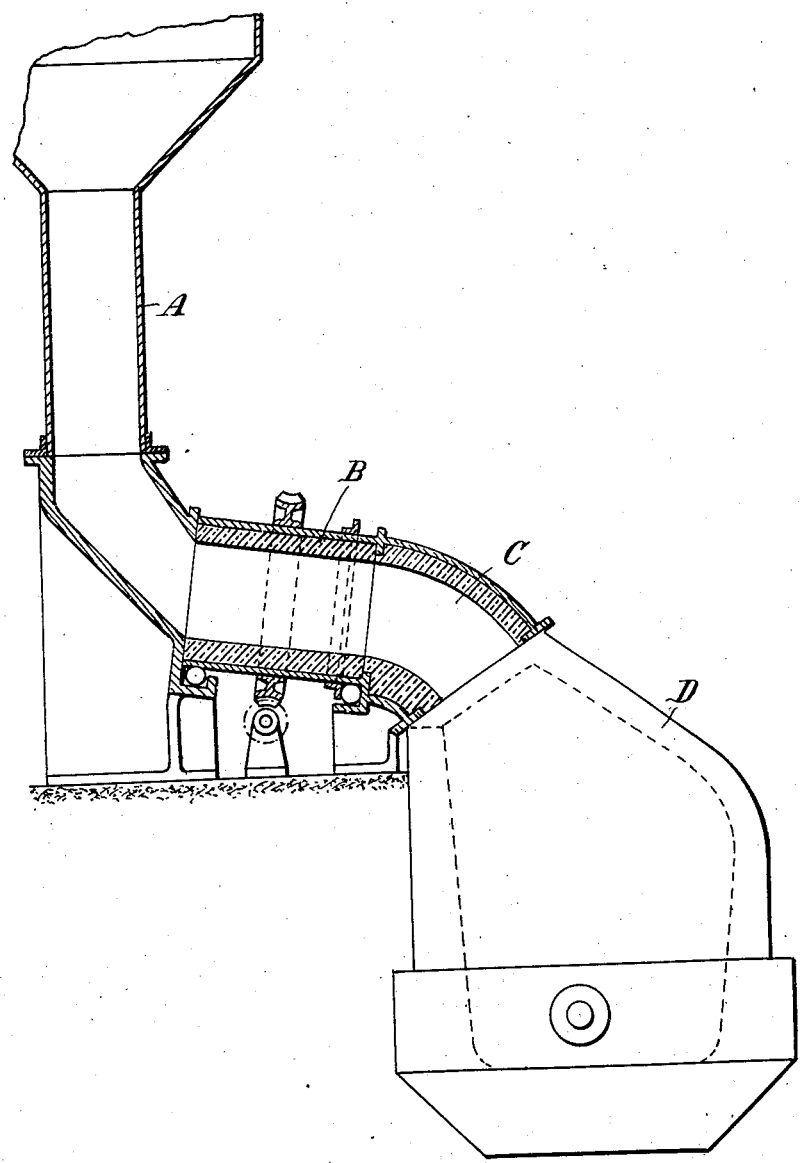

Patented Aug. 25, 1925.

1,551,465

UNITED STATES PATENT OFFICE.

ALFRED BRÜNINGHAUS, OF DORTMUND, GERMANY.

METHOD OF DIRECTLY PRODUCING STEEL.

Application filed January 12, 1925. Serial No. 2,013.

*To all whom it may concern:*

Be it known that I, ALFRED BRÜNING-HAUS, a citizen of the German Republic, residing at Dortmund, Westphalia, Germany, have invented certain new and useful Improvements Relating to a Method of Directly Producing Steel, of which the following is a specification.

According to the present invention steel or an intermediate product suitable as a charge for the hearth-oven is to be produced from ore by a method corresponding to the converter process. For this purpose ores and fuels containing carbon are introduced into the bath of the converter and the blast air is enriched with oxygen.

In this way a product with any desired content or percentage of carbon may be produced according to whether it should leave the converter as finished steel or in a condition adapted to be employed as a charge product for the hearth-oven.

At the beginning of the process the converter is to be charged with raw iron; later on the molten mass may be poured out entirely and the converter may be charged again with raw iron, or a remaining part of the preceding charge may be left in the converter, so that the process may be further carried out with said remaining part.

Thus the process represents itself in such a manner, that the bath is used as a dissolving medium for oxides of iron and carbon, which act one upon another to reduce the iron from the ore. At the same time the bath is heated by the burning of the carbon present in the bath and in the fuel introduced into the latter. For the purpose of raising the temperature, the blast air is enriched with oxygen.

Upon adding oxides of iron the phosphorus oxidizes simultaneously with the carbon. Therefore the same product can be obtained as in the raw-iron process with phosphorous raw iron, whilst by the well-known Thomas process the phosphorus only oxidizes after all of the carbon has been removed.

In order to further economize in the consumption of heat, the converter gases are suitably employed for pre-heating and pre-reducing the ore. For this purpose a rotary oven is used, which works in conjunction with a storage reservoir and with the converter. The action of such pre-reduction is of special importance, as by the enriching of the blast air with oxygen the waste gases are well prepared for the reaction.

The addition of oxides of iron and carbon in the converter process is known. As new is to be considered the facts (1) that according to the present invention a continuous process is maintained which will commence with the charging of the converter with raw-iron and will be continued by constantly adding ores and carbon; and (2) that according to the converter process a product will be produced similar to that obtained in the first part of the raw iron ore-process (Bertrand-Thiel-process).

Furthermore the addition of oxygen to the blast air is known; but according to the present invention, the oxygen is employed for the carrying out of the above named processes; and the oxygen added better prepares the converter gas for the reduction of iron ores.

Without adding oxygen, the adding of larger quantities of ore and substances containing carbon to the bath would be impossile. The bath would become frozen as with said process only a combustion of C to CO takes place and with ordinary air a suitable temperature could not be obtained. The temperature is theoretically considered to be 1764° C., but practically it ranges between 1400°–1500° C. Enriching of the blast air with oxygen for the purpose of obtaining a higher temperature is therefore strictly required.

The expenditures of heat for the reduction of the ores are also very considerable. The quantity of the fuel, which can be introduced, is limited. Therefore in order to avoid useless losses of heat carried off by the escaping nitrogen the air must be enriched with oxygen.

Furthermore it is known to use the waste gases of the converter for the pre-heating or reduction of ores, but it is new (1) to cause this action to take place in a rotary oven, which works in conjunction with the converter and with a storage vessel; (2) and to add oxygen and fuel containing carbon to enrich the waste gases, so that they become better prepared for the reduction.

In the drawing a plant is shown by means of which the new process may be carried out.

The ore together with the flux are charged into the shaft A of the plant and carried in controlled quantities by the inclined rotary pipe B into the converter D. C is an intermediate pipe which provides a connection between the rotary pipe and the converter.

In order to charge the converter D, it will be swung upwardly in the usual manner, so that the mouth of the converter bears against the intermediate piece C. Fuels, which may be in the nature of gas dust or of liquids, are forced into the bath and simultaneously oxygen is introduced into the blast air. The waste gases permeate the ore within the rotary pipe B and the shaft A and have a reducing action thereon.

If the ore is to be brought into the converter, the rotary pipe is set in rotation. Thus it is made possible to bring a large quantity of ore less strongly reduced or a small quantity of ore strongly reduced into the converter. One or the other of these charging methods is used according to how the process is carried out in the converter.

First method: The converter is charged with raw iron having a high percentage of phosphorus. It may be supposed that a product is to be obtained which is similar to the pre-metal employed in the raw iron process with a carbon percentage of about 1% and having a percentage of phosphor as small as possible.

Right at the beginning of the blasting action a strongly oxidized ore and lime is charged by the addition of fuels so that in a known manner the phosphorus of the raw iron is oxidized and combined with the scoria. By controlling the quantity of the ore and the proportions between the blast air and the fuel the bath will be brought to the required percentage of carbon. If the charge becomes too cold, the blast air is enriched with oxygen.

Second method: By the process carried out as above mentioned the phosphorus will be removed from the raw iron or an iron poor in phosphorus is introduced into the converter. The quantity of the bath should be enlarged to the greatest degree by the reduction of iron ores. In this method the feeding of the ores is to be regulated in such a manner, that ores arrive at the converter after they have been reduced to the greatest possible extent and they are combined in the converter with the bath and become reduced to the finished state.

I claim:

1. The method of making steel or intermediate products direct from iron ore which comprises feeding a supply of the ore into a bath of molten iron, introducing from a separate source carbonaceous fuel into the bath to distribute a supply of carbon therein, and introducing an oxygenated gas into the bath.

2. The method of making steel or intermediate products direct from iron ore which comprises introducing the ore into a bath of molten iron, forcing a carbonaceous fuel from a source separate from the ore into the bath to form a carbon solution therein, and introducing an oxygenated gas into the bath.

3. The method of making steel or intermediate products direct from iron ore which comprises introducing the ore and a pulverized carbonaceous fuel, from separate sources, into a bath of molten iron, and introducing oxygenated gas into the bath.

4. The method of making steel or intermediate products direct from phosphoric iron ore which comprises preparing a bath of molten phosphoric iron, introducing into the bath the ore to be reduced, and a fuel containing carbon, from separate sources, whereby the oxides of the ore and carbon are dissolved in the bath, and introducing oxygenated air into the bath.

5. The step of pre-reducing iron ores which comprises subjecting such ores to the action of the gases evolved from a bath of molten iron into which oxygenated gas and iron ore and a carbonaceous fuel from separate sources are introduced.

In testimony whereof I have affixed my signature.

ALFRED BRÜNINGHAUS.